US011698036B2

(12) United States Patent
Dudar et al.

(10) Patent No.: US 11,698,036 B2
(45) Date of Patent: Jul. 11, 2023

(54) METHOD AND SYSTEM FOR OPERATING A REFUELING VALVE

(71) Applicant: Ford Global Technologies, LLC, Dearborn, MI (US)

(72) Inventors: Aed Dudar, Canton, MI (US); Dennis S. Yang, Canton, MI (US); Jeevagan Natarajan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/443,857

(22) Filed: Jul. 28, 2021

(65) Prior Publication Data

US 2023/0032855 A1 Feb. 2, 2023

(51) Int. Cl.
*F02D 41/00* (2006.01)
*F02D 41/02* (2006.01)
*F02M 25/08* (2006.01)
*B01D 53/04* (2006.01)

(52) U.S. Cl.
CPC ..... *F02D 41/0032* (2013.01); *B01D 53/0446* (2013.01); *F02D 41/021* (2013.01); *F02M 25/0809* (2013.01); *F02M 25/0836* (2013.01); *F02M 25/0872* (2013.01); *B01D 2253/102* (2013.01); *B01D 2257/702* (2013.01); *B01D 2259/4516* (2013.01)

(58) Field of Classification Search
CPC ............ F02D 41/0032; F02D 41/0021; F02M 25/0809; F02M 25/0836; F02M 25/0872; B01D 53/0446; B01D 2253/102; B01D 2257/702; B01D 2259/4516
See application file for complete search history.

(56) References Cited

U.S. PATENT DOCUMENTS

| 9,216,646 | B2 | 12/2015 | Yang et al. | |
|---|---|---|---|---|
| 10,060,367 | B2 | 8/2018 | Pursifull | |
| 10,527,008 | B2* | 1/2020 | Kim | F02M 25/0836 |
| 10,704,478 | B1* | 7/2020 | Dudar | F02D 41/0035 |
| 2003/0029226 | A1* | 2/2003 | Kawano | F02M 25/0809 |
| | | | | 73/40.5 R |
| 2005/0258266 | A1* | 11/2005 | Elia | F02M 43/04 |
| | | | | 239/585.1 |
| 2011/0308500 | A1* | 12/2011 | Sato | F02D 19/0605 |
| | | | | 123/495 |
| 2013/0312494 | A1* | 11/2013 | Nishimura | G01M 3/025 |
| | | | | 73/45.5 |
| 2016/0025593 | A1* | 1/2016 | Anderson | F02M 21/0272 |
| | | | | 73/114.36 |
| 2016/0068063 | A1* | 3/2016 | Aso | B60K 15/04 |
| | | | | 220/86.2 |
| 2016/0237921 | A1* | 8/2016 | Mumford | F02D 19/0605 |

(Continued)

FOREIGN PATENT DOCUMENTS

DE 10201913403 A1 6/2020

*Primary Examiner* — Jacob M Amick
*Assistant Examiner* — Sherman D Manley
(74) *Attorney, Agent, or Firm* — Vincent Mastrogiacomo; McCoy Russell LLP

(57) ABSTRACT

Methods and systems are presented for operating a refueling valve of an evaporative emissions system. The methods and systems may attempt to reactivate a refueling valve that has stuck due to the refueling valve being exposed to liquid fuel. In one example, a voltage that is applied to the refueling valve may be increased to reactivate the refueling valve.

16 Claims, 4 Drawing Sheets

(56) References Cited

U.S. PATENT DOCUMENTS

2016/0298579 A1* 10/2016 Peters .................... F02M 25/08
2019/0085783 A1*  3/2019 Kusakabe ............. F02D 41/402
2019/0277417 A1*  9/2019 Onodera ............... F16K 31/047
2020/0370497 A1* 11/2020 Dudar .............. B60K 15/03504

* cited by examiner

METHOD AND SYSTEM FOR OPERATING A REFUELING VALVE

FIELD

The present description relates generally to methods and systems for operating a refueling valve. The refueling valve may release pressure in a sealed fuel tank when a vehicle is refilled with fuel.

BACKGROUND/SUMMARY

A hybrid vehicle may include a refueling valve that may relieve pressure in a sealed fuel tank when the hybrid vehicle is refueled. The refueling valve may be placed in a conduit that extends from a recirculation tube to a conduit that is coupled to a carbon filled canister. The conduit that is coupled to the carbon filled canister and the recirculation tube may hold fuel vapors that are recirculated back to the fuel tank or that are directed to the carbon filled canister. However, if the fuel tank is filled to a full level and then trickle filled with additional fuel, it may be possible for liquid fuel to enter the recirculation tube and the refueling valve. The refueling valve may not operate as expected if liquid fuel enters the refueling valve. In particular, the refilling valve may not close as expected. Therefore, it may be desirable to provide a way for the refueling valve to operate.

The inventor herein has recognized the above-mentioned issue and have developed a method for operating an evaporative emissions system, comprising: supplying a voltage generated via an alternator for a first duration to a stuck refueling valve; and supplying the voltage generated via the alternator for a second duration to the stuck refueling valve after supplying the voltage generated via the alternator for the first duration and before the stuck refueling valve is unstuck, the second duration longer than the first duration.

By increasing a voltage that is applied to a refueling valve, it may be possible to unstick the stuck refueling valve. In addition, if the stuck refueling valve does not become unstuck after increasing the voltage that is applied to the stuck refueling valve, a duration that a voltage is applied to the stuck refueling valve may be increased so that fuel within the stuck refueling valve may be vaporized so that liquid fuel no longer interferes with operation of the refueling valve.

The present description may provide several advantages. In particular, the approach may reactivate a stuck refueling valve so that an evaporative emissions system may operate as desired. In addition, the approach may reduce warranty costs for the evaporative emissions system. Further, the approach may be invoked whether or not an engine of the vehicle is being operated.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
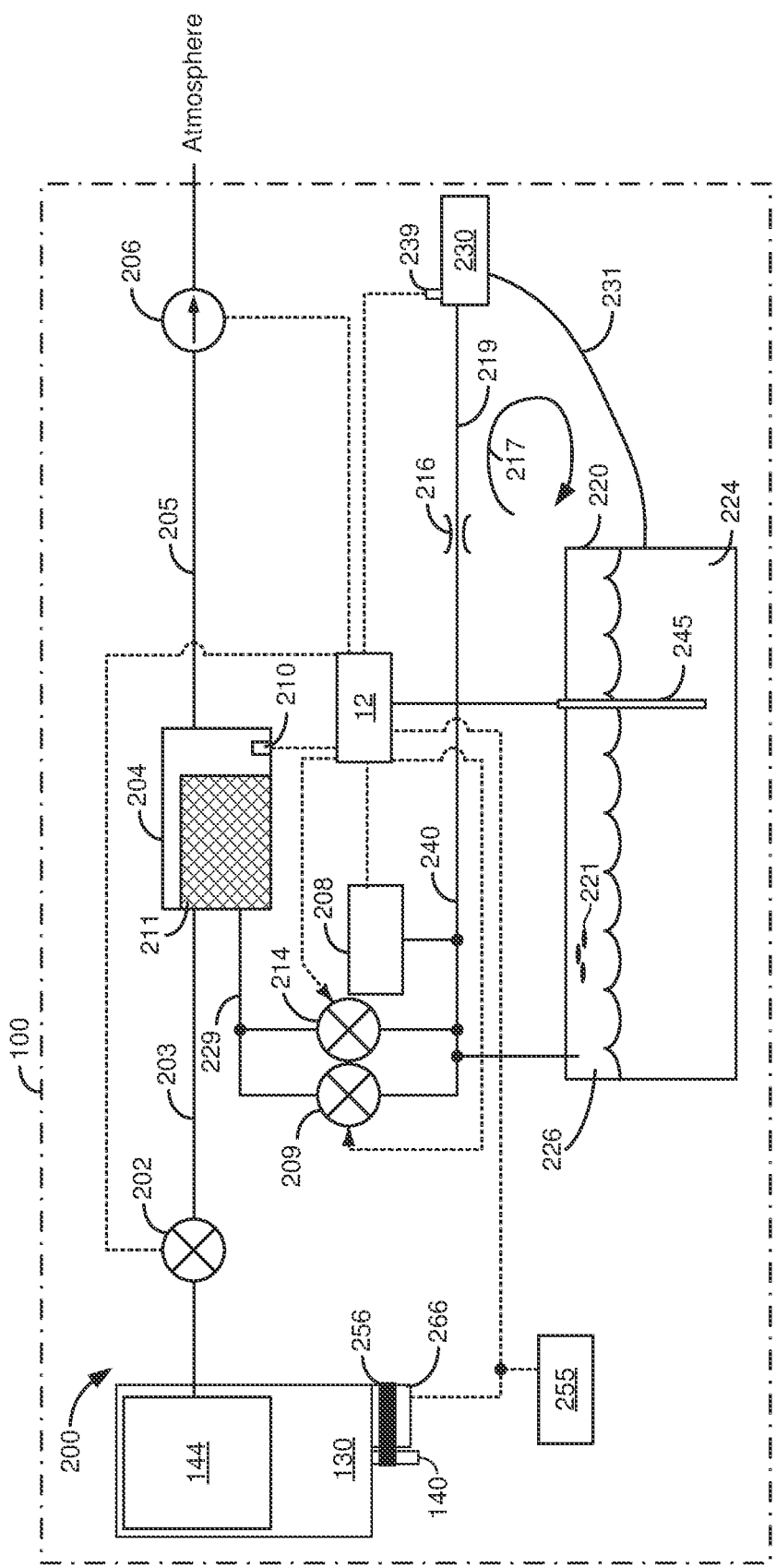
FIG. 2 shows a block diagram of an example evaporative emissions system for a vehicle.
Figure 3:
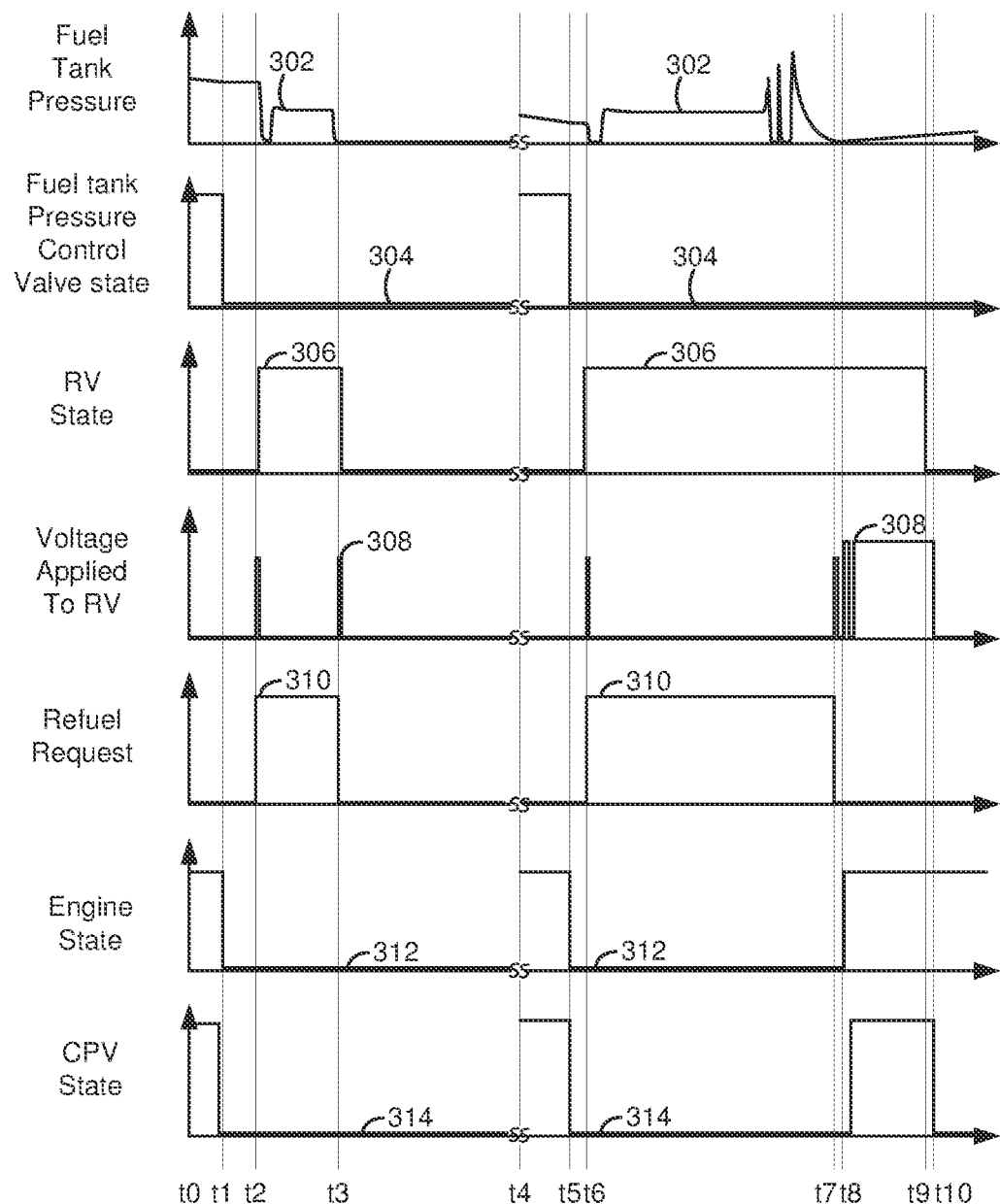
FIG. 3 shows an example evaporative emission system operating sequence according to the method of FIG. 4.

The following description relates to systems and methods for operating an evaporative emissions system that includes a refueling valve. The refueling valve may rapidly reduce pressure in a sealed fuel tank so that fuel vapors do not exit a fuel filling tube when a vehicle is about to be refilled with fuel. A vehicle may include an engine of the type shown in FIG. 1. The vehicle may also include an evaporative emissions system as shown in FIG. 2. The evaporative emissions system may be operated as shown in FIG. 3 to control a refueling valve in an evaporative emissions system. The evaporative emissions system may be operated according to the method that is described by the flowchart in FIG. 4.

Figure 1:
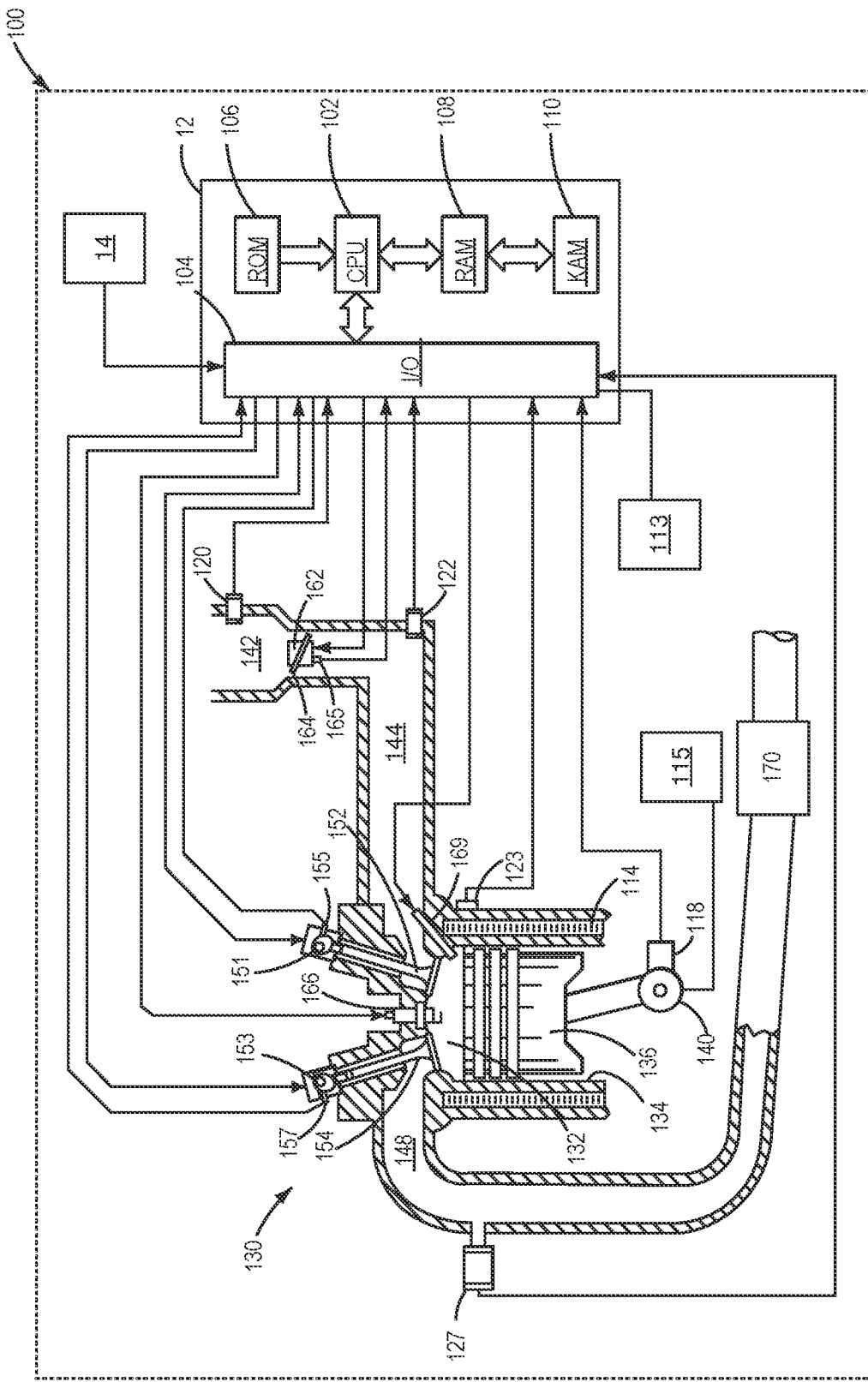
FIG. 1 shows an example engine that may be included in the systems and methods described herein.

Referring now to FIG. 1, vehicle 100 includes one or more controllers (e.g., controller 12 and autonomous driver 14) for receiving sensor data and adjusting actuators. Controller 14 may operate vehicle 100 autonomously such that vehicle 100 steers, brakes, increases vehicle speed, decreases vehicle speed, obeys traffic signals and signs, and responds to its surrounding conditions without being driven via a human operator. In some examples, controller 14 may cooperate with additional controllers (e.g., controller 12) to operate vehicle 100.

FIG. 1 shows a schematic diagram of one cylinder of a multi-cylinder engine 130. Engine 130 may be controlled at least partially by a control system including a controller 12 and by input from an autonomous driver or controller 14. Alternatively, a vehicle operator (not shown) may provide input via an input device, such as an engine torque, power, or air amount input pedal (not shown).

A combustion chamber 132 of the engine 130 may include a cylinder formed by cylinder walls 134 with a piston 136 positioned therein. The piston 136 may be coupled to a crankshaft 140 so that reciprocating motion of the piston is translated into rotational motion of the crankshaft. The crankshaft 140 may be coupled to at least one drive wheel of a vehicle via an intermediate transmission system. Further, a starter motor (not shown) may be coupled to the crankshaft 140 via a flywheel to enable a starting operation of the engine 130.

Combustion chamber 132 may receive intake air from an intake manifold 144 via an intake passage 142 and may exhaust combustion gases via an exhaust passage 148. The intake manifold 144 and the exhaust passage 148 can selectively communicate with the combustion chamber 132 via respective intake valve 152 and exhaust valve 154. In some examples, the combustion chamber 132 may include two or more intake valves and/or two or more exhaust valves.

In this example, the intake valve 152 and exhaust valve 154 may be controlled by cam actuation via respective cam actuation systems 151 and 153. The cam actuation systems 151 and 153 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 152 and exhaust valve 154 may be determined by position sensors 155 and 157, respectively. In alternative examples, the intake valve 152 and/or exhaust valve 154 may be controlled by electric valve actuation. For example, the cylinder 132 may alternatively include an intake valve controlled via electric valve actuation and an exhaust valve controlled via cam actuation including CPS and/or VCT systems.

A fuel injector 169 is shown coupled directly to combustion chamber 132 for injecting fuel directly therein in proportion to the pulse width of a signal received from the controller 12. In this manner, the fuel injector 169 provides what is known as direct injection of fuel into the combustion chamber 132. The fuel injector may be mounted in the side of the combustion chamber or in the top of the combustion chamber, for example. Fuel may be delivered to the fuel injector 169 by a fuel system (not shown) including a fuel tank, a fuel pump, and a fuel rail. In some examples, the combustion chamber 132 may alternatively or additionally include a fuel injector arranged in the intake manifold 144 in a configuration that provides what is known as port injection of fuel into the intake port upstream of the combustion chamber 132.

Spark is provided to combustion chamber 132 via spark plug 166. The ignition system may further comprise an ignition coil (not shown) for increasing voltage supplied to spark plug 166. In other examples, such as a diesel, spark plug 166 may be omitted.

The intake passage 142 may include a throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 132 among other engine cylinders. The position of the throttle plate 164 may be provided to the controller 12 by a throttle position signal. The intake passage 142 may include a mass air flow sensor 120 and a manifold air pressure sensor 122 for sensing an amount of air entering engine 130.

An exhaust gas sensor 127 is shown coupled to the exhaust passage 148 upstream of an emission control device 170 according to a direction of exhaust flow. The sensor 127 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 127 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 170 is shown arranged along the exhaust passage 148 downstream of the exhaust gas sensor 127. The device 170 may be a three way catalyst (TWC), $NO_x$ trap, various other emission control devices, or combinations thereof. In some examples, during operation of the engine 130, the emission control device 170 may be periodically reset by operating at least one cylinder of the engine within a particular air-fuel ratio.

Engine 130 may provide torque to transmission 115. Transmission 115 may supply torque to rotate vehicle wheels (not shown). Transmission 115 may be an automatic step ratio transmission, a dual clutch transmission, a continuously variable transmission, or other known types of transmission. Transmission 115 may be shifted into park, neutral, reverse, or drive.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 130, in addition to those signals previously discussed, including measurement of inducted mass air flow (MAF) from the mass air flow sensor 120; engine coolant temperature (ECT) from a temperature sensor 123 coupled to a cooling sleeve 114; an engine position signal from a Hall effect sensor 118 (or other type) sensing a position of crankshaft 140; throttle position from a throttle position sensor 165; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 144. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing at least portions of the methods described below as well as other variants that are anticipated but not specifically listed. Thus, controller 12 may operate actuators to change operation of engine 130. In addition, controller 12 may post data, messages, and status information to human/machine interface 113 (e.g., a touch screen display, heads-up display, light, etc.).

During operation, each cylinder within engine 130 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 132 via intake manifold 144, and piston 136 moves to the bottom of the cylinder so as to increase the volume within combustion chamber 132. The position at which piston 136 is near the bottom of the cylinder and at the end of its stroke (e.g. when combustion chamber 132 is at its largest volume) is typically referred to by those of skill in the art as bottom dead center (BDC).

During the compression stroke, intake valve 152 and exhaust valve 154 are closed. Piston 136 moves toward the cylinder head so as to compress the air within combustion chamber 132. The point at which piston 136 is at the end of its stroke and closest to the cylinder head (e.g. when combustion chamber 132 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 166, resulting in combustion.

During the expansion stroke, the expanding gases push piston 136 back to BDC. Crankshaft 140 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc.

Referring now to FIG. 2, a block diagram of an example evaporative emissions system 200 is shown. Evaporative emissions system 200 includes a canister purge valve (CPV) 202, a carbon filled canister 204, a pump 206, a tank pressure control valve 209, a refueling valve 214, a fuel tank pressure sensor 208, a carbon canister temperature sensor 210, a fuel tank inlet 230, a tank cap position sensor 239, and an orifice 216. Carbon filled canister 204 may include activated carbon 211 to store fuel vapors 221. Refueling valve 214 may have a valve seat (not shown) that is larger than a valve seat of tank pressure control valve 209 for rapid depressurization of fuel tank 220.

Filler neck 231 is a conduit or pipe that allows fluidic communication between fuel tank 220 and fuel tank inlet 230. Recirculation line or pipe 219 provides fluidic coupling between orifice 216 and fuel tank inlet 230. Fuel vapor line or pipe 240 allows fluidic communication between tank 220, orifice 216, pressure sensor 208, tank pressure control valve 209, and refueling valve 214. Fuel vapor line or pipe 229 allows fluidic communication between tank pressure control valve 209, refueling valve 214 and carbon filled canister 204. Conduit 205 allows for fluidic communication between carbon filled canister 204 and pump 206. Conduit 203 allows fluidic communication between carbon filled canister 204 and CPV 202. Fuel vapors may be recirculated in the recirculation line 219 and filler neck 231 as indicated by arrow 217.

Fuel 224 in fuel tank 220 may generate vapors 221 that migrate to vapor space 226 within fuel tank 220 when fuel 224 is exposed to warm temperatures and agitation. Fuel vapors 221 may migrate from vapor space 226 toward atmosphere when either or both of tank pressure control valve 209 is open and pump 206 is activated. Refueling valve 214 may be opened to release fuel vapors 221 in to carbon filled canister 204 when vehicle 100 is being refueled. Fuel level sensor 245 may provide an indication of a fuel level in fuel tank 220. Additionally, sensor 239 may indicate when a fuel nozzle (not shown) is positioned to provide fuel to filler neck pipe 231 and fuel tank 220.

Electrical connections between controller 12 and devices are indicated via dashed lines. Alternator 266 or battery 255 may supply electric power to controller 12 so that controller 12 may selectively activate and deactivate valves and sensors described herein. Alternator 266 may output a voltage that is greater than a voltage of battery 255. Alternator 266 may provide output when it is rotated via crankshaft 140 and belt 256.

Thus, the system of FIGS. 1 and 2 provides for a vehicle system, comprising: a vehicle including an internal combustion engine, a fuel tank, a carbon filled canister, and a refueling valve; and a controller including executable instructions stored in non-transitory memory that cause the controller to vaporize a fuel in the refueling valve. The vehicle system includes where the fuel is vaporized when the refueling valve is stuck open. The vehicle system includes where the fuel is vaporized via supplying a voltage to the refueling valve. The vehicle system further comprises additional instructions to start the internal combustion engine in response to the refueling valve being stuck open. The vehicle system includes where the refueling valve is positioned in a conduit that extends from a recirculation tube to a conduit that is coupled to the carbon filled canister. The vehicle system further comprises additional instructions to determine that the refueling valve is stuck. The vehicle system includes where the determination is based on a pressure.

Referring now to FIG. 3, two example sequences for operating an evaporative emissions system are shown. The sequence of FIG. 3 may be provided by the system of FIGS. 1 and 2 in cooperation with the method of FIG. 4. Vertical markers at times t0-t10 represent times of interest during the sequence. All of the plots occur at a same time and same vehicle operating conditions. The SS marks along the horizontal axes represent breaks in time and the duration of the break may be long or short. FIG. 3 shows a first fuel tank filling during which trickle fueling is not applied to fill the fuel tank. FIG. 3 also shows a second fuel tank filling during which trickle fueling is applied to fill the fuel tank.

The first plot from the top of FIG. 3 is a plot of fuel tank pressure (e.g., pressure in a fuel tank) versus time. The vertical axis represents the fuel tank pressure and the fuel tank pressure increases in the direction of the vertical axis arrow. The horizontal axis represents time and time increases from the left side of the plot to the right side of the plot. Trace 302 represents the fuel tank pressure.

The second plot from the top of FIG. 3 is a plot of an operating state of a fuel tank pressure control valve versus time. The vertical axis represents the fuel tank pressure control valve state and the fuel tank pressure control valve is open when trace 304 is at a higher level near the vertical axis arrow. The fuel tank pressure control valve is closed when trace 304 is at a lower level near the horizontal axis. The horizontal axis represents time and time increases from the left side of the plot to the right side of the plot. Trace 304 represents the fuel tank pressure control valve operating state.

The third plot from the top of FIG. 3 is a plot of a refueling valve state versus time. The vertical axis represents the refueling valve state and the refueling valve state is open when trace 306 is at a higher level near the vertical axis arrow. The refueling valve is closed when trace 306 is near the level of the horizontal axis. The horizontal axis represents time and time increases from the left side of the plot to the right side of the plot. Trace 306 represents the refueling valve state.

The fourth plot from the top of FIG. 3 is a plot of a level of voltage that is applied to the refueling valve versus time. The vertical axis represents the level of the voltage that is applied to the refueling valve and the voltage level increases in the direction of the vertical axis arrow. The horizontal axis represents time and time increases from the left side of the plot to the right side of the plot. Trace 308 represents the level of voltage that may be applied to the refueling valve.

The fifth plot from the top of FIG. 3 is a plot of a state of a refueling request versus time. The vertical axis represents the refueling request and refueling is requested when trace 310 is at a level that is near the vertical axis arrow. Refueling is not requested when trace 310 is at a level that is near the horizontal axis. The horizontal axis represents time and time increases from the left side of the plot to the right side of the plot. Trace 310 represents the refueling request state. A refueling request may be generated via a vehicle occupant or based on a level of fuel in a fuel tank. For example, a vehicle operator may press a button or open a fuel fill door to generate a refueling request.

The sixth plot from the top of FIG. 3 is a plot of a state of an engine versus time. The vertical axis represents the engine state and engine starting or running is requested when trace 312 is at a level that is near the vertical axis arrow. The engine is off when trace 312 is at a level that is near the horizontal axis. The horizontal axis represents time and time increases from the left side of the plot to the right side of the plot. Trace 312 represents the engine operating state.

The fifth plot from the top of FIG. 3 is a plot of a state of a canister purge valve (CPV) versus time. The vertical axis represents the CPV state and CPV is open when trace 314 is at a level that is near the vertical axis arrow. The CPV is closed when trace 314 is at a level that is near the horizontal axis. The horizontal axis represents time and time increases from the left side of the plot to the right side of the plot. Trace 314 represents the CPV state.

At time t0, a first fuel tank filling sequence begins and the pressure in the fuel tank is at a higher level and the fuel tank pressure control valve is open to reduce the pressure in the fuel tank. The refueling valve is closed and voltage is not applied to the refueling valve. The refueling request is not asserted and the vehicle's engine is running (e.g., rotating and combusting fuel). The CPV valve is open and fuel vapors are being drawn into the engine (not shown).

At time t1, the engine is stopped automatically and the CPV is closed in response to the engine stopping. The fuel tank pressure control valve is also closed in response to the engine stopping and the fuel tank pressure ceases decreasing. The refueling valve is closed and voltage is not applied to the refueling valve. A refueling request is not present.

At time t2, a refueling request is generated and the refueling valve is opened shortly thereafter. Opening the refueling valve causes pressure in the fuel tank to decline. The fuel tank pressure control valve remains closed and battery voltage (e.g., 12 volts) is briefly applied to open the refueling valve. The engine remains stopped and the CPV remains closed.

Between time t2 and time t3, fuel tank pressure increases and then decreases while the fuel tank is being filled. The fuel tank pressure control valve remains closed and the refueling valve remains open. The voltage applied to the refueling valve returns to zero after the refueling valve is opened. The engine remains stopped and the CPV remains closed.

At time t3, the refueling request is withdrawn and the refueling valve state changes shortly thereafter when battery voltage is applied again to the refueling valve. The fuel tank pressure is low and the engine remains off. The CPV is closed and the fuel tank pressure control valve is closed.

Thus, when the refueling valve closes after the fuel tank is refilled, no additional actions are needed since the evaporative emissions system is operating as expected. In this example, trickle fueling is not used to top off the fuel tank. Consequently, liquid fuel may not enter the fuel refueling valve so that the fuel refueling valve may operate as expected.

At time t4, a second fuel tank filling sequence begins and pressure in the fuel tank is at a lower level and it is decreasing since the engine is running and the CPV and the fuel tank pressure control valves are open. The refueling valve is closed and voltage is not applied to the refueling valve. A refueling request is not asserted.

At time t5, the engine is stopped automatically and the CPV is closed in response to the engine stopping. The fuel tank pressure control valve is also closed in response to the engine stopping and the fuel tank pressure ceases decreasing. The refueling valve is closed and voltage is not applied to the refueling valve. A refueling request is not present.

At time t6, a refueling request is generated and the refueling valve is opened shortly thereafter. The refueling valve is opened via applying battery voltage to the refueling valve. Opening the refueling valve causes pressure in the fuel tank to decline. The fuel tank pressure control valve remains closed and the engine remains stopped. The CPV remains closed.

Between time t6 and time t7, fuel tank pressure increases and then decreases while the fuel tank is being filled. Near time t7, the fuel tank is trickle filled by slowing the rate of fuel flow into the fuel tank after the fuel nozzle has closed due to pressure in the fuel filler neck. The fuel tank pressure increases briefly several times to higher pressures. In one example, fuel tank pressure exceeding a threshold level may be indicative that fuel has entered the refueling valve. Fuel tank pressure may increase by fuel in the refueling valve choking off flow through the refueling valve when fuel is flowing into the fuel tank. The fuel tank pressure control valve remains closed and the refueling valve remains open. The voltage applied to the refueling valve returns to zero after the refueling valve is opened. The engine remains stopped and the CPV remains closed.

At time t7, the refueling request is withdrawn and battery voltage (e.g., 12 volts) is applied to the refueling valve, but the refueling valve state does not change. Rather, the refueling valve remains open. The refueling valve remaining open may be determined based on pressure in the fuel tank. In particular, pressure in the fuel tank may not increase when the refueling valve is stuck open. The fuel tank pressure is low and the engine remains off. The CPV remains closed.

At time t8, the refueling request remains withdrawn and the vehicle's engine is started so that a greater voltage may be applied to the refueling valve. Starting the engine allows the engine to rotate an alternator and the alternator may output a voltage that is greater than battery voltage. Shortly after the engine is started, the alternator output voltage (e.g., 14 volts) is applied to the refueling valve. However, the refueling valve does not close so the alternator voltage is applied to the refueling valve for a longer period of time so that the refueling valve heats fuel that is in the refueling valve and causes the fuel to vaporize. The longer period of time may be a predetermined amount of time so that the refueling valve reaches a threshold temperature. The CPV valve is also opened so that the engine may consume fuel vapors from the evaporative emissions system. The fuel tank pressure control valve remains closed and the fuel tank pressure remains low, but it begins to increase. A properly operating refueling valve may open in response to a first voltage pulse, and it may close in response to a second voltage pulse. The refueling valve may latch in an open or closed state so that voltage need not continuously be applied to the refueling valve.

At time t9, the refueling valve closes as sufficient fuel in the refueling valve is vaporized, which allows the refueling valve to close. The fuel tank pressure control valve remains closed and fuel tank pressure continues to increase. The refueling request remains withdrawn and the engine continues to operate. The CPV also remains open.

At time t10, the voltage that is applied to the refueling valve is reduced to zero and the fuel tank pressure control valve remains closed. The refueling request remains withdrawn and the engine continues to operate. The CPV is closed in response to the refueling valve closing.

In this way, a stuck refueling valve may be closed. The approach may first attempt to close the refueling valve simply by increasing a voltage that is applied to the refueling valve. If such action does not open the refueling valve, a voltage may be applied to the refueling valve that is sufficient in time duration to vaporize fuel that may be in the refueling valve, thereby allowing the refueling valve to operate again.

Figure 4:
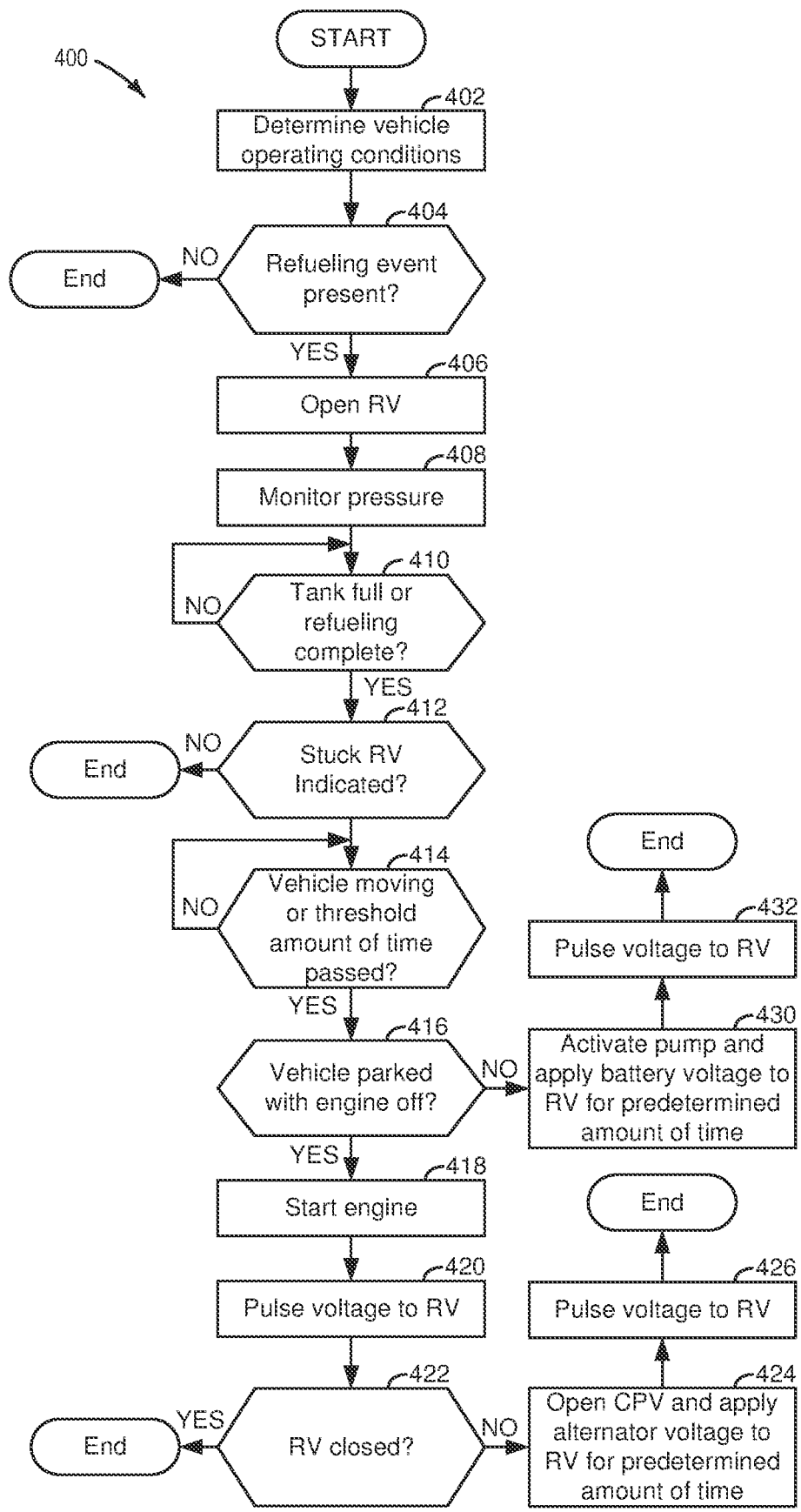
FIG. 4 shows an example method for operating an evaporative emissions system.

Referring now to FIG. 4, an example method 400 for operating an evaporative emissions system is shown. At least portions of method 400 may be included in and cooperate with a system as shown in FIGS. 1 and 2 as executable instructions stored in non-transitory memory. The method of FIG. 4 may cause the controller to operate actuators in the real world and receive data and signals from sensors described herein when the method is realized as executable instructions stored in controller memory.

At 402, method 400 determines vehicle operating conditions. Vehicle operating conditions may include but are not limited to fuel tank pressure, fuel filler neck state, engine temperature, ambient temperature, vehicle speed, a fuel level in a fuel tank, an amount of fuel vapor stored in a carbon filled canister, and engine state (e.g., on/off). Method 400 proceeds to 404.

At 404, method 400 judges if a vehicle is in the process of being refilled with fuel (e.g., a refueling event is present), or if the vehicle is about to be refilled with fuel. In one example, method 400 may judge that the vehicle is in the process of being refilled with fuel based on a position of a fuel filler cap. However, in other examples, method 400 may judge that the vehicle is in the process of being filled with fuel based on a pressure in the fuel tank. If method 400 judges that the vehicle is in the process of being filled with fuel, the answer is yes and method 400 proceeds to 406. Otherwise, the answer is no and method 400 proceeds to exit. In some examples, method 400 may close the refueling valve (RV) and deactivate an emissions system pump if the answer is no.

At 406, method 400 opens the refueling valve via supplying a short duration voltage pulse (e.g., 100 millisecond battery voltage pulse) to the refueling valve. The voltage pulse opens the refueling valve and the refueling valve latches open so that the voltage may be withdrawn from the refueling valve, thereby conserving power. Opening the refueling valve allows the fuel tank to depressurize and allows fuel vapors into the carbon filled canister. Method 400 may also activate a pump in the evaporative emissions system to air out of the carbon filled canister. Method 400 proceeds to 408.

At 408, method 400 monitors pressure in the fuel tank via monitoring pressure in a conduit in which fuel vapors may flow. Method 400 proceeds to 410.

At 410, method 400 judges if the fuel tank is full or if the refueling process is complete. In one example, method 400 may judge if the fuel tank is full based on output of a fuel level sensor. Method 400 may judge that fuel tank refilling is complete based on a position of a fuel filler cap. Alternatively, method 400 may judge that the fuel tank is full based on fuel tank pressure while the fuel tank is filling. If method 400 judges that the fuel tank is full, or judges that the refueling process is complete, the answer is yes and method 400 proceeds to 412. If method 400 judges that the fuel tank is not full, or judges that the refueling process is not complete, the answer is no and method 400 returns to 410.

At 412, method 400 judges if the refueling valve is stuck open. In one example, method 400 may judge that the refueling valve is stuck open if pressure in the fuel tank or a conduit exceeds a threshold pressure. Alternatively, method 400 may judge that the refueling valve is stuck open based on output of a valve position sensor. If method 400 judges that the refueling valve is stuck open, the answer is yes and method 400 proceeds to 414. Otherwise, the answer is no and method 400 exits.

At 414, method 400 judges if the vehicle that includes the refueling valve is moving or if a threshold amount of time has passed since the fuel tank was most recently filled. If so, the answer is yes and method 400 proceeds to 416. If not, the answer is no and method 400 returns to 414.

At 416, method 400 judges if the vehicle is parked with the vehicle's engine off. Method 400 may judge that the vehicle is parked based on an operating state of a transmission. Method 400 may judge that the engine is stopped if the rotational speed of the engine is zero. If method 400 judges that the vehicle is parked with the engine off, the answer is yes and method 400 proceeds to 430. Otherwise, the answer is no and method 400 proceeds to 418.

At 418, method 400 starts the engine if the engine is not already running. The engine is started so that a higher voltage than battery voltage may be applied to the refueling valve. In addition, the engine may consume fuel vapors from the evaporative emissions system while the engine is running. Method 400 proceeds to 420.

At 420, method 400 provides a voltage pulse (e.g., 100 millisecond voltage pulse) to the refueling valve. The voltage level is the output level of the alternator, which is greater than battery voltage. Method 400 proceeds to 422.

At 422, method 400 judges if the refueling valve has closed in response to the voltage pulse that was applied to the refueling valve. In one example, method 400 may judge that the refueling valve has closed based on an increase in pressure in the fuel tank or in a conduit that is coupled to the fuel tank. In another example, method 400 may judge that the refueling valve has closed based on output of a position sensor. If method 400 judges that the refueling valve has closed, the answer is yes and method 400 proceeds to exit. Otherwise, the answer is no and method 400 proceeds to 424.

At 424, method 400 opens the canister purge valve (CPV) and applies alternator output voltage to the refueling valve (RV) for a predetermined amount of time. The predetermined amount of time may be an amount of time that is sufficient for fuel in the refueling valve to vaporize when alternator voltage is applied to the refueling valve. Method 400 proceeds to 426.

At 426, method 400 may optionally provide a voltage pulse (e.g., 100 millisecond pulse) to the refueling valve. The voltage pulse may be provided to change the state of the refueling valve if the refueling valve does not change state due to the voltage applied at 424. Method 400 proceeds to exit.

At 430, method 400 activates an evaporative emissions pump (e.g., 206) and applies battery voltage to the refueling valve for a predetermined amount of time. The predetermined amount of time may be an amount of time it takes for battery voltage applied to the refueling valve to vaporize fuel within the refueling valve. Activating the pump may draw fuel vapors into the carbon filled canister so that the fuel vapors may be stored. Method 400 proceeds to 432.

At 432, method 400 may optionally provide a voltage pulse (e.g., 100 millisecond pulse) to the refueling valve. The voltage pulse may be provided to change the state of the refueling valve if the refueling valve does not change state due to the voltage applied at 430. Method 400 proceeds to exit.

In this way, a refueling valve that is stuck open may be closed. If a greater voltage pulse is insufficient to change an operating state of the refueling valve, a voltage may be applied to the refueling valve so that fuel within the refueling valve may be vaporized. Consequently, liquid fuel, which may prevent a state change in the refueling valve, may be removed from the refueling valve via vaporization. The fuel vapors from the refueling valve may be consumed by an engine or stored in a carbon filled canister.

Thus, method 400 provides for a method for operating an evaporative emissions system, comprising: supplying a voltage generated via an alternator for a first duration to a stuck refueling valve; and supplying the voltage generated via the alternator for a second duration to the stuck refueling valve after supplying the voltage generated via the alternator for the first duration and before the stuck refueling valve is unstuck, the second duration longer than the first duration. The method further comprises vaporizing fuel in the stuck refueling valve via the voltage generated via the alternator for the second duration. The method includes where the stuck refueling valve is located along a conduit that extends between a recirculation tube and a conduit that is coupled to a carbon filled canister. The method further comprises starting an engine to produce the voltage generated via the alternator. The method further comprises supplying the voltage generated via the alternator for a third duration after vaporizing the fuel. The method further comprises activating a pump to pump fuel vapors from the stuck refueling valve. The method includes where the pump is activated when a vehicle is parked. The method includes where the fuel vapors are pumped to a carbon filled canister.

The method of FIG. 4 also provides for a method for operating an evaporative emissions system, comprising: applying a voltage to a refueling valve via a controller in response to a pressure in a conduit, the refueling valve positioned along a conduit extending from a recirculation tube to a conduit that is coupled to a carbon filled canister. The method includes where the pressure is indicative of the refueling valve being stuck. The method includes where the voltage is generated via an alternator. The method further comprises vaporizing fuel in the refueling valve via the voltage. The method further comprises closing the refueling valve after vaporizing fuel in the refueling valve.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
    a vehicle including an internal combustion engine, a fuel tank, a carbon filled canister, and a refueling valve in fluidic communication with the carbon filed canister and the fuel tank; and
    a controller including executable instructions stored in non-transitory memory that cause the controller to supply a voltage to the refueling valve that causes a fuel in the refueling valve to heat and then vaporize, and additional instructions to start the internal combustion engine in response to the refueling valve being stuck open.

2. The vehicle system of claim 1, where the fuel is vaporized when the refueling valve is stuck open.

3. The vehicle system of claim 1, where the refueling valve is positioned in a conduit that extends from a recirculation tube to a conduit that is coupled to the carbon filled canister.

4. The vehicle system of claim 3, further comprising additional instructions to determine that the refueling valve is stuck.

5. The vehicle system of claim 4, where the determination is based on a pressure.

6. A method for operating an evaporative emissions system, comprising:
    supplying a voltage generated via an alternator for a first duration to a stuck refueling valve;
    supplying the voltage generated via the alternator for a second duration to the stuck refueling valve after supplying the voltage generated via the alternator for the first duration and before the stuck refueling valve is unstuck, the second duration longer than the first duration; and heating and then vaporizing a fuel in the stuck refueling valve via the voltage generated via the alternator for the second duration;

where the refueling valve is in fluidic communication with a carbon filed canister and a fuel tank.

7. The method of claim 6, where the stuck refueling valve is located along a conduit that extends between a recirculation tube and a conduit that is coupled to the carbon filled canister.

8. The method of claim 6, further comprising starting an engine to produce the voltage generated via the alternator.

9. The method of claim 8, further comprising supplying the voltage generated via the alternator for a third duration after vaporizing the fuel.

10. The method of claim 6, further comprising activating a pump to pump fuel vapors from the stuck refueling valve.

11. The method of claim 10, where the pump is activated when a vehicle is parked.

12. The method of claim 10, where the fuel vapors are pumped to the carbon filled canister.

13. A method for operating an evaporative emissions system for an internal combustion, comprising:

applying a voltage to a refueling valve via a controller in response to a pressure in a conduit, the refueling valve positioned along a conduit extending from a recirculation tube to a conduit that is coupled to a carbon filled canister; and starting the internal combustion engine in response to the refueling valve being stuck open;

where the recirculation tube is in fluidic communication with a fuel tank and a fuel tank inlet; and where a duration of the application of the voltage to the refueling valve causes a fuel within the valve to heat and then vaporize.

14. The method of claim 13, where the pressure is indicative of the refueling valve being stuck.

15. The method of claim 13, where the voltage is generated via an alternator.

16. The method of claim 13, further comprising closing the refueling valve after vaporizing fuel in the refueling valve.

* * * * *